United States Patent [19]

Nakajima et al.

[11] Patent Number: 4,632,372
[45] Date of Patent: Dec. 30, 1986

[54] RUBBER VIBRATION INSULATOR

[75] Inventors: Zenji Nakajima, Okazaki; Shuichi Okamoto; Motoo Kunihiro, both of Tsu, all of Japan

[73] Assignees: Toyo Rubber Industry Co., Osaka; Toyota Jidosha Kabushiki Kaisha, Toyota, both of Japan

[21] Appl. No.: 707,779

[22] Filed: Mar. 4, 1985

[30] Foreign Application Priority Data

Mar. 7, 1984 [JP] Japan ............................ 59-33375[U]

[51] Int. Cl.$^4$ ............................................. F16F 15/04
[52] U.S. Cl. ................................. 267/140.1; 248/562
[58] Field of Search ............... 248/634, 635, 636, 638, 248/659, 562; 180/300, 298; 267/8 R, 35, 113, 118, 120, 122, 141, 140.1

[56] References Cited

U.S. PATENT DOCUMENTS

| 4,418,897 | 12/1983 | Hartel | 248/562 |
|---|---|---|---|
| 4,483,521 | 11/1984 | Kakimoto | 248/562 |
| 4,491,304 | 1/1985 | Kakimoto | 267/140.1 |
| 4,593,891 | 6/1986 | Okamoto | 267/140.1 |

FOREIGN PATENT DOCUMENTS

| 115417 | 8/1984 | European Pat. Off. | 267/140.1 |
|---|---|---|---|
| 2802896 | 7/1979 | Fed. Rep. of Germany | 267/140.1 |
| 149436 | 11/1980 | Japan | 267/140.1 |
| 66539 | 6/1981 | Japan | 267/140.1 |
| 171136 | 10/1982 | Japan | 267/140.1 |
| 37337 | 3/1983 | Japan | 267/141 |
| 72740 | 4/1983 | Japan | 267/140.1 |
| 170935 | 10/1983 | Japan | 267/35 |
| 170934 | 10/1983 | Japan | 267/140.1 |

Primary Examiner—J. Franklin Foss
Assistant Examiner—Robert A. Olson
Attorney, Agent, or Firm—Flynn, Thiel, Boutell & Tanis

[57] ABSTRACT

A rubber vibration insulator comprising a boss member as one fitting, a tubular body, an annular elastic member interposed between the boss member and one end of the tubular body, a plate member as the other fitting surrounding fixedly the opposite end of the tubular body, thus forming together with the aforesaid elements a sealed chamber having variable volume, and a capsule housed in the sealed chamber, in which a damping liquid is filled. The capsule comprises an external shell consisting of a rubber plate having an orifice and a plate body joined together and a diaphragm disposed transversely in the shell, thereby dividing its internal chamber into an air sub-chamber on the rubber plate side and a liquid sub-chamber on the plate body side. The rubber plate of the shell may be defined with recesses on both sides in a vertical symmetry and dispersedly to form thin film portions or be in the form of a thin rubber plate which is interposed between two porous plates at a clearance and play between them. With the arrangement of the capsule, the spring rate of the diaphragm can be lessened and the liquid pressure in the sealed chamber can be prevented from rising in the high frequency region. Thus, muffled sounds and transmission sounds are insulated.

6 Claims, 4 Drawing Figures

RUBBER VIBRATION INSULATOR

FIELD OF THE INVENTION

This invention relates to a rubber vibration insulating device which is mounted for vibration insulation of an engine as a vibration source when suspended on a chassis of a motor vehicle.

BACKGROUND OF THE INVENTION

In supporting engines suspended on motor vehicles in a vibration-isolating manner, the number of revolutions per minute of the engines themselves varies over a wide range and consequently, vibration-absorbing mounts that are capable of fulfilling the two requirements are indispensable: for one thing, the damping coefficient must be large during high-amplitude oscillations, low-frequency oscillations occurring at low speed and for the other thing, vibration insulating ability is high against high frequency oscillations occurring at high speed. However, noises due to low frequency oscillations and noises due to high frequency oscillations are contrary to each other in characteristics, hence it is very difficult to solve both at the same time.

There have been heretofore provided rubber vibration insulating devices of a type in which a damper material such as rubber is used for a sealed annular elastic body and a damping liquid such as a non-freezing liquid is enclosed within the sealed annular body whereby a damper effect through an orifice is imparted. Some of them now find commercial acceptance.

However, existing devices of this type are constructed so that a partition wall provided in a damper liquid chamber formed by one mounting bracket and a diaphragm having an orifice in the lower part thereof has generally a high rigidity and is secured to the other mounting bracket. Hence, these have serious drawbacks in that dynamic spring rate in the high frequency oscillation region becomes large and the liquid pressure of the damper liquid chamber becomes high, which causes muffled sounds to be generated that impair quietness of the vehicle room. Here, if a partition wall having the function characteristic of absorbing small amplitude oscillations in the high frequency vibration region is used instead, then such function characteristics of it in the medium and low frequency regions will be poor.

SUMMARY OF THE INVENTION

This invention is designed for solving the problems prior art rubber vibration insulators pose. That is, an essential object of this invention is to provide a superior rubber vibration insulating device having a reduced liquid pressure and a small dynamic spring rate in the high frequency region and rid of generation of muffled sounds thereby to assist greatly in the field of utilization of engines in the motor vehicle industry.

In order to attain the foregoing object, in accordance with the present invention, a rubber vibration insulating device comprises a boss member as one fitting or mounting bracket, a tubular body, an annular elastic member interposed between the boss member and one end of the tubular body, and a plate member as the other fitting or mounting bracket surrounding and secured to the opposite end of the tubular body, thus forming a sealed chamber having a variable volume surrounded hermetically by the foregoiong elements, the sealed chamber encasing therein a capsule and being filled with a liquid; wherein the capsule comprises an external shell associated by a rubber plate and a plate body, defining a chamber having a variable volume internally thereof and a diaphragm transversely provided in the chamber, the diaphragm dividing the chamber into an air sub-chamber surrounded by the diaphragm and the plate body and a liquid sub-chamber surrounded by the diaphragm and the rubber plate, the rubber plate being provided with an orifice apertured in its thickness direction and providing communication between the liquid sub-chamber and the sealed chamber. With this construction, high frequency oscillations can be absorbed by the annular elastic member whereas low frequency oscillations and medium frequency oscillations can be absorbed and damped by the passage of the liquid through the orifice. In particular, the diaphragm bearing on the passage of the liquid is arranged within the sealed chamber surrounded by the boss member, plate member, both as a fitting and the annular elastic member and has not any mechanical linkage to them, so that it is possible to lower the rigidity of the diaphragm by making the thickness of it small. As a consequence, in the high frequency region, even if liquid pressure in the sealed chamber rises, the diaphragm oscillates only in extremely small amplitudes, which allows the liquid pressure to be reduced and lessens the dynamic spring rate. Thus, insulating effects on muffled sounds can also be obtained.

BRIEF DESCRIPTION OF THE DRAWINGS

Preferred embodiments of this invention will be hereinafter described in more detail with reference to the accompanying drawings, in which.

DETAILED DESCRIPTION OF THE INVENTION

Figure 1:
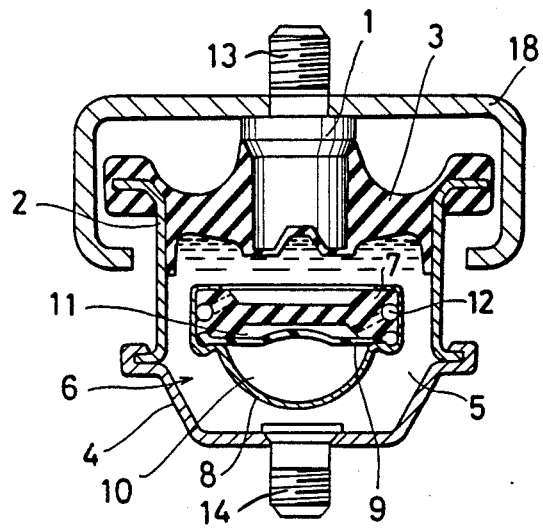
FIG. 1 is a central longitudinal cross-sectional view showing one example of this invention.
Figure 2:
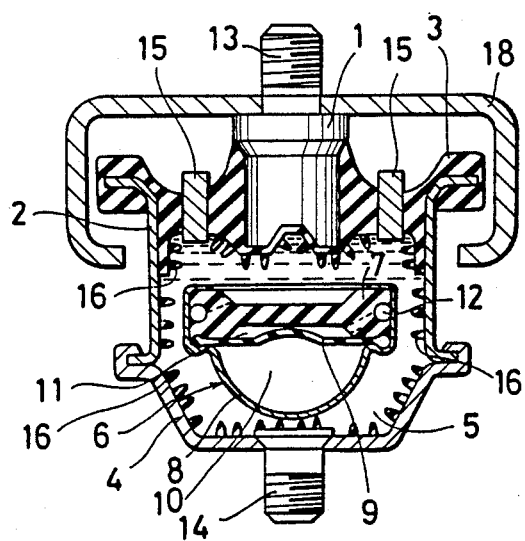
FIG. 2 is a central longitudinal cross-sectional view showing another example of this invention.

As shown in FIG. 1 and FIG. 2, the device of this invention is constituted of a boss member 1 as one fitting or mounting bracket for attaching to an engine or a chassis of motor vehicle, a tubular body 2 made of a rigid material such as steel, an annular elastic member 3 made of rubber, a plate member 4 as the other fitting or mounting bracket for attaching to a chassis of motor vehicle or an engine and a capsule 6.

The annular elastic member 3 is concentrically arranged and interposed between the boss member 1 and the tubular body 2, with the inner peripheral portion thereof being secured integrally to the boss member 1 and the outer peripheral portion thereof being secured integrally to the one end of the tubular body 2.

The connections of the annular elastic member 3 to the boss member 1 and to the tubular body 2 must be liquid-tight and sufficiently durable to mechanical external forces. To that end, it is preferred to effect vulcanization bonding treatment.

The tubular body 2 thus secured firmly to the annular elastic member 3 at one end is secured at the opposite end to the plate member 4 which extends transversely in a manner surrounding the tubular body at its opposite end. That is, the plate member 4 and the tubular body 2 are locked to each other by caulking, welding, etc. to ensure air-tightness and mechanical strength.

A sealed chamber 5 is defined, surrounded air-tightly by the boss member 1, the annular elastic member 3, the tubular body 2 and the plate member 4 and has a variable volume. The sealed chamber 5 houses therein the capsule 6 and is filled with a liquid such as a non-freezing liquid under an appropriate pressure.

The capsule 6 has an external shell in which a rubber plate 7 formed of a peripheral portion having a larger thickness than its inner portion and a hemi-spherical or rounded plate body 8 are joined together. The shell defines internally thereof a chamber having a variable volume inside of which a diaphragm 9 is transversely provided. Thus, the diaphragm 9 divides the chamber into an air sub-chamber 10 surrounded by the diaphragm 9 and the plate body 8 and a liquid sub-chamber 11 surrounded by the diaphragm 9 and the rubber plate 7.

The capsule 6 is provided with an orifice 12 pierced through the rubber plate 7 in its thickness direction, the orifice allowing communication between the sealed chamber 5 and the liquid sub-chamber 11 thereby to fill the liquid sub-chamber 11 with the non-freezing liquid. It is natural that the filled amount of the non-freezing liquid comes to a definite amount when it is kept in an equilibrium with the pressure of air enclosed in the air sub-chamber 10.

The orifice 12 is, in the examples shown in FIGS. 1 and 2, apertured peripherally in the peripheral portion of the rubber plate 7 in the form of a ring groove. Further, the rubber plate 7 is formed, on the upper and lower sides, with opposed openings or cavities in the radially inner direction of the orifice groove. Otherwise, the rubber plate 7 may be provided in its thin central portion with holes of small radius apertured in the axial thickness direction. It is possible to provide any orifice having a required flow resistance depending on the cross-sectional area and the passage length of it.

The capsule 6 constructed in this manner is encased in the sealed chamber 5 in a floating state in the liquid filled in it or in a manner fixing one portion of the plate body 8 to one portion of the inner wall of the tubular body 2.

The reference numerals 13 and 14 indicate an attaching bolt fastened to the boss member 1 and an attaching bolt fastened to the plate member 4, respectively, and the reference numeral 18 indicates a stopper for limiting the maximum displacement of the tubular body 2 against the boss member 1.

In another example shown in FIG. 2, the device is constructed as described above, but further featured by a mass damper 15 having a short cylinder shape being integral with the annular elastic member 3 in its middle portion and that the interior wall of the sealed chamber 5 defined by the boss member 1, the tubular body 2 and the plate member 4 are formed with a plurality of projections 16 made of rubber by vulvanization bonding. These projections 16 may be provided on the external side of the capsule 6.

In use, the rubber vibration insulator of this invention constructed as described above is fitted between an engine and a chassis of vehicle with the aid of the bolts 13, 14 provided on the boss member 1 and the plate member 4. When the engine is stopped, the diaphragm 9 of the capsule 6 is stabilized in a flat form under an equilibrium condition between the liquid pressure and the pneumatic pressure.

When the engine is operated and oscillated, the annular elastic member 3 accommodates dynamic compressive deflections to exhibit dynamic springing characteristics and performs vibration insulating action. Concurrently, the deflections of the annular elastic member 3 cause variation in the volume of the sealed chamber 5 which causes the liquid to flow between the sealed chamber 5 and the liquid sub-chamber 11 via the orifice 12. As a consequence, a high damping capacity is obtained by the throttling effect of the liquid passing through the orifice 12.

In the high frequency vibration region where amplitude is generally small, the liquid pressure in the sealed chamber 5 is usually elevated. According to this invention, the diaphragm 9 constituting the wall of the liquid subchamber 11 has such a low rigidity that it oscillates readily and variation in the volume of the sealed chamber 5 occurs, reducing the liquid pressure in it. As a result, dynamic spring rate becomes small, and muffled sounds and transmission sounds are absorbed significantly, thus keeping quietness.

In the case of another example shown in FIG. 2, the rubber vibration insulating device has further functions in addition to the functions as stated above. That is, the mass damper 15 serves as a damper against transmission of the oscillations of the annular elastic member 3 in the compression directions and serves to keep the spring rate of insulator device itself large against the oscillations in the shearing directions. For instance, it is possible to make the resonance frequency of the mass damper 15 about 350 Hz against the oscillations in the compression directions and to make it about 150 Hz against the oscillations in the shearing directions by choosing appropriately the weight, radius and thickness of the mass damper 15. In this manner, the mass damper functions sufficiently to insulate engine transmission sounds of 300–600 Hz which are liable to occur upon acceleration and deceleration, thus aiding greatly in retaining quietness of the vehicle room. Furthermore, by the provision of a plurality of the rubber projections 16 on the interior wall of the sealed chamber 5, even if the floating capsule 6 makes contact with the interior wall of the sealed chamber 5, the occurrence of abnormal sounds is avoided and any shock is absorbed. Accordingly, the provision of these more enhances retaining quietness and long life.

Figure 3:
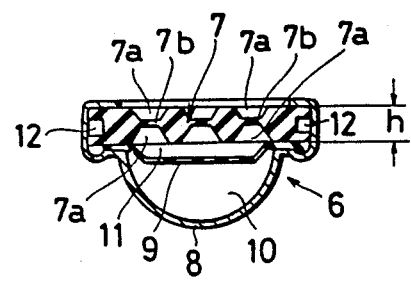
FIG. 3 and FIG. 4 are each a cross-sectional view of a capsule relating to further examples of this invention.
Figure 4:
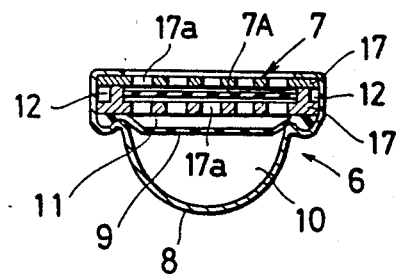

According to further examples of the device of this invention, another examples of the capsule 6 are shown in FIG. 3 and FIG. 4.

With the capsule 6 in the example of FIG. 3, the rubber plate 7 is provided, on both sides inwardly of a peripheral portion of it, with recesses 7a which are arranged in opposed intervals and in a symmetrical manner, which configuration forms at the bottoms of the opposed recesses 7a thin film portions 7b extending dispersedly at intervals in the rubber layer.

The device having the capsule 6 thus constructed in this example (FIG. 3) has advantageous features in functions as compared with the devices having the capsule 6 illustrated in FIG. 1 and FIG. 2. In the latter case where the rubber plate 7 is formed of a flat plate, it is not possible to determine precisely the deflection limit magnitude of the rubber plate 7 as a whole upon deflection under a liquid pressure. When it is necessary to adjust the deflection magnitude, the rubber plate 7 needs to be replaced by another one having a different hardness or one having a different thickness. In the former case where the thin film portions 7b are formed partly, it is possible to adjust the increment of the liquid pressure by varying the number of the thin film portions 7b. It is further possible to limit the deflection magnitude of the thin film portions 7b within the axial thickness h of the rubber plate 7. This offers advantageous features from the viewpoint of effective space.

With the capsule 6 in the example of FIG. 4, the rubber plate 9 includes the rubber disc 7A formed to be thin in thickness is interposed between two porous plates 17, 17 made of a rigid synthetic plastics each provided with a plurality of small holes 17a. A pair of the porous plates 17, 17 are superposed at such a clearance and play between them that the rubber disc 7A may be disposed with a play to the extent that it can deflect up to a definite limit magnitude in its axial thickness direction. Here, the small holes 17a of the porous plates 17, 17 are preferred to be coaxially opposed to each other.

The rubber vibration insulating device having the capsule 6 constructed in a manner described above can operate in good response to any differential increases in the liquid pressure to prevent effectively any increase in the dynamic springing because of the floatingly movable provision of the rubber disc 7A there. A further advantage is that it is possible to set simply and easily a dynamic springing-down region (damping-down region) at amplitudes below a required amplitude by varying the clearance distance between the porous plates 17, 17 which is a factor of determing or limiting deflection magnitude of the rubber disc 7A.

Advantageous effects attained by the rubber vibration insulating device of this invention constructed and operating as described above are summarized below:

(a) The annular elastic member 3 accommodates dynamic compressive deflections to exhibit spring characteristics effective for vibration insulation whilst the throttling action of the orifice 12 through which the liquid passes causes to exhibit high damping capacity against oscillations.

(b) The arrangement participating in damping function against oscillations, in particular low frequency oscillations is encapsulated in the sealed chamber inside the robust and strong structural body, submerged in the liquid. This ensures a sufficient protection against external forces and long life of the device.

(c) The diaphragm 9 forming the outer wall of the air sub-chamber 11 together with the rubber plate 7 having the orifice 12 is of such a construction that allows to lower the rigidity and to lessen the spring rate. Hence, the diaphragm 9 is susceptible of oscillating in the high frequency vibration region of the engine, so that it serves to restrain the liquid pressure in the sealed chamber 5 from rising. As a result, muffled sounds and transmission sounds are not conveyed to the vehicle room inside and quietness is conferred.

(d) Should the diaphragm 9 of the capsule 6 be broken during use, only the damping capacity is reduced and there is no leak of the liquid to the outside. Thus, the heavy weight loading capacity persists and is assured reliably.

The embodiments of the invention in which an exclusive property or privilege is claimed are defined as follows:

1. A rubber vibration insulating device, comprising:
a boss member,
a cylindrical body;
an annular elastic member interposed between and sealingly interconnecting said boss member and one end of said cylindrical body;
a plate member sealingly secured to an opposite end of said cylindrical body whereby a sealed chamber having a variable volume is defined and surrounded hermetically by the foregoing elements, said sealed chamber housing internally thereof a capsule comprising an external shell which consists of a rubber plate and a plate body joined together and a diaphragm transversely provided inside said shell thereby forming an air sub-chamber surrounded by said diaphragm and said plate body and a liquid sub-chamber surrounded by said diaphragm and said rubber plate, said rubber plate having means defining an orifice extending through said rubber plate for providing communication between said liquid sub-chamber and said sealed chamber, said sealed chamber being filled with a liquid so that said liquid passes through said orifice between said sealed chamber and said liquid sub-chamber, said capsule being wholly surrounded by said liquid in said sealed chamber and floatingly suspended in said liquid.

2. A rubber vibration insulating device as claimed in claim 1, wherein said rubber plate constituting a part of said shell of said capsule is provided on both sides of an inner portion thereof with plural spaced recesses, opposed bottoms of said recesses defining a thin film portion in said rubber plate.

3. A rubber vibration insulating device as claimed in claim 1, wherein said rubber plate constituting a part of said shell of said capsule includes a pair of porous plates and a rubber disc interposed between said porous plates so as to be floatingly movable up to a definite deflection magnitude in its axial thickness direction.

4. A rubber vibration insulating device as claimed in claim 1, wherein said annular elastic member incorporates in its middle portion a mass damper in the cylinder shape.

5. A rubber vibration insulating device as claimed in claim 1, wherein the interior wall of said sealed chamber is formed with a plurality of rubber projections.

6. A rubber vibration insulating device as claimed in claim 1, wherein an external wall of said capsule is formed with a plurality of rubber projections.

* * * * *